March 19, 1929.  E. D. LEWIS  1,705,869
SEWAGE DISPOSAL MEANS
Filed Dec. 15, 1927
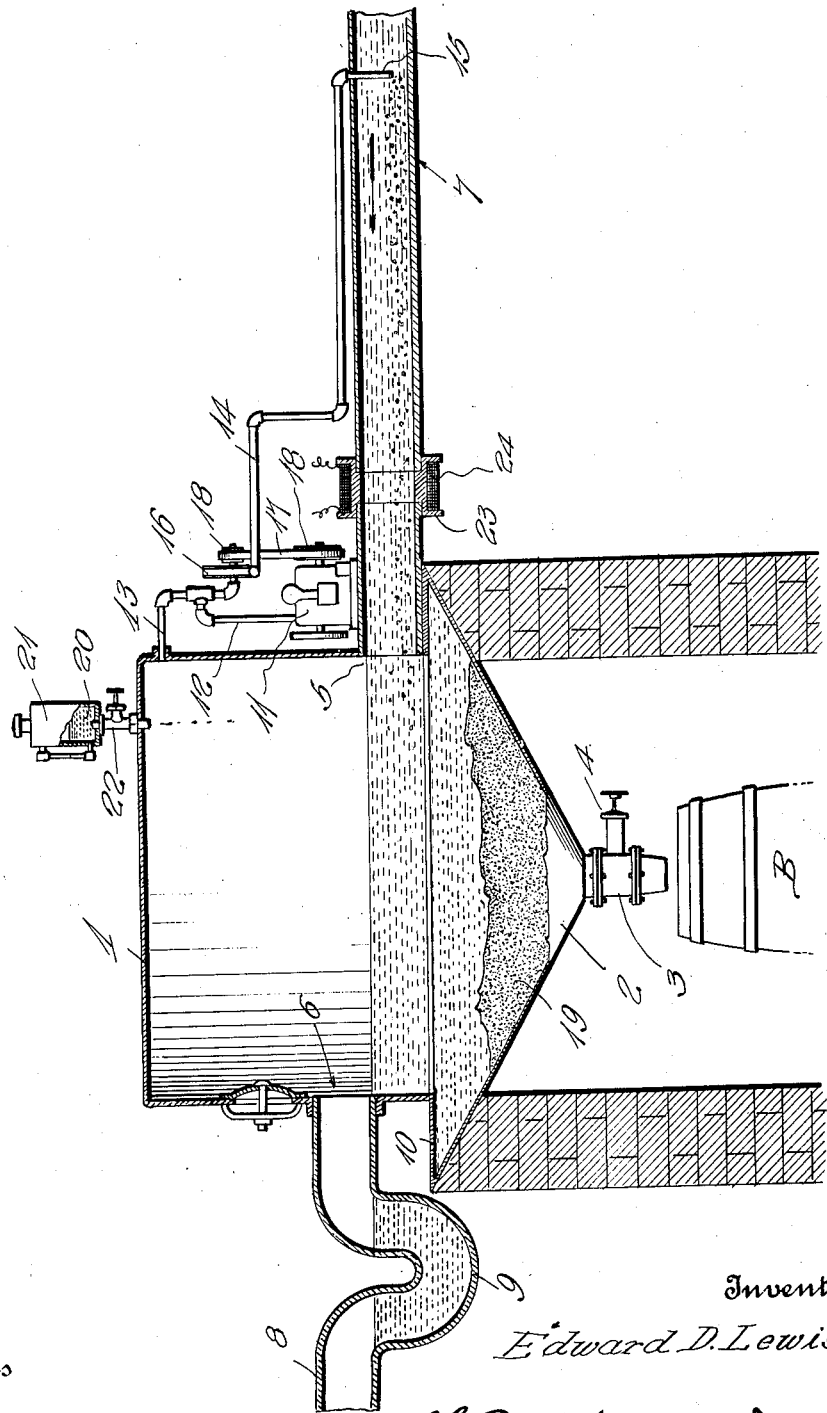
Witness
Inventor
Edward D. Lewis,
By H. B. Willson & Co.
Attorneys Patented Mar. 19, 1929.

1,705,869

UNITED STATES PATENT OFFICE.

EDWARD D. LEWIS, OF ELMIRA, NEW YORK.

SEWAGE-DISPOSAL MEANS.

Application filed December 15, 1927. Serial No. 240,252.

The invention aims primarily to provide a new and improved sewage disposal means in which purification takes place before discharge, in which the heavier matter from the sewage is trapped for use as fertilizer and in which the trapped matter is treated with an insect repellant to prevent flies and other insects from breeding in or feeding on such matter, when exposed.

A further object is to provide novel means for utilizing the carbon monoxide gas from the exhaust of an internal combustion engine, as the purifying germ-killing agent for the sewage.

With the foregoing in view, the invention resides in the novel subject matter hereinafter described and claimed, description being accomplished by reference to the accompanying drawing, which discloses a vertical sectional view partly in elevation of a sewage disposal means constructed in accordance with my invention.

In the drawing above briefly described, the numeral 1 denotes a settling tank having a hopper-like bottom 2 provided with a discharge neck 3 which is equipped with an appropriate gate-valve 4. Tank 1 is provided with a sewage inlet 5 and with a purified liquid outlet 6, a sewer 7 being connected with said inlet while a liquid discharge pipe 8 connects with the outlet. A trap 9 has been shown in this pipe 8 to prevent escape of gas from the upper portion of the tank 1, but any other desired provision may be made for this purpose.

Preferably, the lower portion of the tank 1 is of greater diameter than its upper portion and the two are joined by a horizontal portion 10 which tends to prevent upward surging of accumulated matter from the hopper 2 during storms, when rapid rush of water to the tank 1 takes place, and rapid discharge from said tank.

11 denotes an internal combustion engine of the type which is governor-controlled to only fire as long as it is running below a predetermined speed, the piston or pistons of said engine merely serving to draw in air and then expel it through the same opening, when the engine is "drifting" between explosions. The exhaust pipe 12 of the engine 11 is provided with two branches 13—14, said branch 13 discharging into the upper portion of the tank 1, while branch 14 discharges at 15 into the sewage within the sewer 7. This branch 14, embodies a gas pump 16 driven by any desired means such as a belt 17 and pulleys 18, from the engine 11.

Each time the engine 11 fires, some of the exhaust gas is forced through the branch 14 into the sewage in the sewer 7, and some of said gas passes through the branch 13, to accumulate in the upper portion of the tank 1. During the intervals at which the engine 11 is not firing, the pump 16 draws the accumulated gas from the tank 1 through the branch 13, and forces it through the branch 14 into the sewage. Thus, as long as the engine is operating, there is a continual discharge of carbon monoxide gas into the sewage in the sewer 7, with the result that all germs in said sewage are killed. Then too, while part of the gas may be absorbed by the liquid, the remainder is entrained with the liquid travel and again arrives in the upper portion of the tank 1 for further use.

In the tank 1, the velocity of the germ-free sewage, is checked, with the result that the relatively heavy or solid matter 19 settles upon the bottom 2, whereas the purified liquid discharges through the pipe 8. The matter 19 may be removed from time to time by opening the valve 4, and it may be received in any desired container, for instance a barrel B, a truck, a conveyor, etc. This matter forms efficient fertilizer, and in order to prevent flies and other insects from feeding upon it or breeding in it, it is treated before discharge, by an insect-repelling agent. This agent is in liquid form and is denoted at 20, in a suitable container 21, said container having a drip outlet 22 through the top or other portion of the tank 1. The liquid 20 may be an appropriate metallic salt and it is of course heavier than water, so that it will settle through the accumulated liquid in the tank 1 and will reach the accumulated matter 19, to act upon the latter in the desired capacity.

The sewer 7 embodies a section 23 of brass or other non-magnetic material, and around this section, there is a coil 24 of magnet wire. This provision constitutes an auxiliary germ killer for use when it is necessary to throw the engine 11 out of operation, for one reason or another. Electric current passed through the coil 24, generates magnetic, induction or eddy currents which play back and forth between the brass pipe section 23 and its axis. These currents destroy all germ life and are equally as efficient as the use of carbon monoxide gas from the engine 11. However due to expense, the germ-killing means 23—24, is only used in emergency, that is, when it is essential to throw engine 11 out of operation.

While excellent results may be obtained from the general construction herein disclosed, it is to be understood that within the scope of the invention as claimed, variations may be made.

I claim:—

1. In a sewage disposal means, a sewage container, an internal combustion engine, and means for conducting exhaust gas from said engine to said container and discharging it into the liquid within said container, said gas conducting means embodying a pump driven by said engine.

2. In a sewage disposal means, a settling tank having a liquid inlet and a liquid outlet, a sewer leading to said inlet, a generator for germ-killing gas, means for conducting generated gas from the generator to said settling tank, and means for conducting the gas from said tank to said sewer and discharging it into the sewer-contained liquid.

3. In a sewage disposal means, a settling tank having a liquid inlet and a liquid outlet, a sewer leading to said inlet, an internal combustion engine, exhaust gas-conducting means from said engine having portions leading to said tank and said sewer respectively, the portion leading to the sewer being provided with a gas pump delivering toward said sewer, and driving means for said pump actuated by said engine.

4. In a sewage disposal means, a settling tank, a container for an insect-repelling liquid, and a drip outlet from said container into said settling tank to so treat the accumulated solid matter therein as to repel flies and other insects when said solid matter is removed from the tank.

5. In a sewage disposal means, a settling tank having a relatively small upper portion and a lower portion of greater diameter in which relatively heavy matter collects, said upper and lower portions of the tank being connected by a horizontal portion to retard upward surging of the accumulated matter from the lower toward the upper portion of the tank when rapid passage of liquid takes place from the inlet to the outlet of said tank.

In testimony whereof I have hereunto affixed my signature.

EDWARD DUDLEY LEWIS.